(12) United States Patent
LaTerza et al.

(10) Patent No.: US 12,105,837 B2
(45) Date of Patent: Oct. 1, 2024

(54) GENERATING PRIVATE SYNTHETIC TRAINING DATA FOR TRAINING MACHINE-LEARNING MODELS

(71) Applicant: Microsoft Technology Licensing, LLC

(72) Inventors: Christopher Lawrence LaTerza, Issaquah, WA (US); Girish Kumar, Santa Clara, CA (US); David Benjamin Levitan, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 17/517,465

(22) Filed: Nov. 2, 2021

(65) Prior Publication Data

US 2023/0137378 A1   May 4, 2023

(51) Int. Cl.
*G06F 21/62* (2013.01)
*G06F 18/214* (2023.01)
(Continued)

(52) U.S. Cl.
CPC ........ *G06F 21/6245* (2013.01); *G06F 18/214* (2023.01); *G06F 40/40* (2020.01); *G06N 3/045* (2023.01)

(58) Field of Classification Search
CPC ........ G06F 21/62; G06F 21/78; G06F 21/602; G06F 21/6245; G06F 21/6254;
(Continued)

(56) References Cited

U.S. PATENT DOCUMENTS 10,460,235 B1 * 10/2019 Truong ................... G06F 18/40
10,999,256 B2    5/2021 Weggenmann et al.
(Continued)

FOREIGN PATENT DOCUMENTS

EP         3591586 A1      1/2020

OTHER PUBLICATIONS

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).*
(Continued)

*Primary Examiner* — James N Fiorillo
(74) *Attorney, Agent, or Firm* — Novo TechIP International PLLC

(57) ABSTRACT

A method and system for generating synthetic privacy preserving training data for training a language classifier machine-learning (ML) model includes receiving a request to generate the synthetic privacy-preserving training data for the language classifier ML model, retrieving labeled training data associated with training the language classifier ML model, providing the labeled training data, one or more privacy parameters, and a domain type associated with the labeled training data to a synthetic data generation ML model, the synthetic data generation ML model being configured to generate synthetic training data in a privacy-persevering manner, receiving synthetic privacy-preserving training data as an output from the synthetic data generation
(Continued)

ML model, and providing the synthetic privacy preserving training data to the language classifier ML model for training the language classifier ML model in classifying text.

18 Claims, 6 Drawing Sheets

(51) Int. Cl.
*G06F 40/40* (2020.01)
*G06N 3/045* (2023.01)

(58) Field of Classification Search
CPC ........ G06F 18/214; G06F 40/20; G06F 40/30;
G06F 40/40; G06N 3/08; G06N 3/045;
H04L 9/08; H04L 9/825; H04L 9/844;
H04L 9/866; H04L 9/3247
USPC .......................................................... 726/26
See application file for complete search history.

(56) References Cited

U.S. PATENT DOCUMENTS

| | | | |
|---|---|---|---|
| 11,093,707 B2* | 8/2021 | Tan | G06V 30/1988 |
| 2018/0018590 A1* | 1/2018 | Szeto | G16H 50/20 |
| 2019/0237061 A1* | 8/2019 | Rusak | G06F 40/216 |
| 2019/0244601 A1* | 8/2019 | Rusak | G10L 15/063 |
| 2019/0295545 A1* | 9/2019 | Andreas | G10L 15/1815 |
| 2020/0012890 A1 | 1/2020 | Watson et al. | |
| 2020/0226212 A1* | 7/2020 | Tan | G06F 18/214 |
| 2020/0227030 A1* | 7/2020 | Tan | G06F 40/205 |
| 2020/0228500 A1* | 7/2020 | Olumofin | H04L 63/1483 |
| 2020/0327252 A1* | 10/2020 | McFall | G06F 21/78 |
| 2021/0201195 A1 | 7/2021 | Vengertsev et al. | |
| 2021/0232705 A1 | 7/2021 | Chandelier et al. | |
| 2022/0012155 A1* | 1/2022 | Xiao | G06F 11/3447 |
| 2022/0058444 A1* | 2/2022 | Olabiyi | G06F 40/35 |
| 2022/0129697 A1* | 4/2022 | Jog | G06V 10/82 |
| 2022/0172050 A1* | 6/2022 | Dalli | G06N 3/045 |
| 2022/0374605 A1* | 11/2022 | Sethi | G06F 1/3206 |
| 2023/0044509 A1* | 2/2023 | Guo | H04R 25/507 |

OTHER PUBLICATIONS

Beaulieu-Jones et al., Privacy-preserving generative deep neural networks support 1 clinical data sharing, 7/52017, bioRxiv, total pp. 40, http://dx.doi.org/10.1101/159756 (Year: 2017).*

Malekzadeh et al., Replacement AutoEncoder: A Privacy-Preserving Algorithm for Sensory Data Analysis, 2018 IEEE/ACM Third International Conference on Internet-of-Things Design and Implementation, pp. 166-176 (Year: 2018) (Year: 2018).*

Beaulieu-Jones et al., Privacy-preserving generative deep neural networks support 1 clinical data sharing, 7/52017, bioRxiv, total pp. 40, http://dx.doi.org/10.1101/159756 (Year: 2017) (Year: 2017).*

Jegorova, et al., "Survey: Leakage and Privacy at Inference Time", In Repository of arXiv:2107.01614, Jul. 4, 2021, 22 Pages.

"International Search Report and Written Opinion Issued in PCT Application No. PCT/US22/046204", Mailed Date: Jan. 27, 2023, 11 Pages.

Yang, et al., "PATE-AAE: Incorporating Adversarial Autoencoder into Private Aggregation of Teacher Ensembles for Spoken Command Classification", In Repository of arXiv:2104.01271, Jun. 15, 2021, 5 Pages.

"Application Filed in U.S. Appl. No. 16/830,224", filed Mar. 25, 2020, 64 Pages.

Kuppa, et al., "Towards Improving Privacy of Synthetic DataSets", In Proceedings of the Annual Privacy Forum, Jun. 17, 2021, 16 Pages.

Lampridis, et al., "Explaining Sentiment Classification with Synthetic Exemplars and Counter-Exemplars", In Proceedings of the International Conference on Discovery Science, Oct. 15, 2020, pp. 357-373.

Maqsud, Umar, "Synthetic Text Generation for Sentiment Analysis", In Proceedings of the 6th Workshop on Computational Approaches to Subjectivity, Sentiment and Social Media Analysis, Sep. 17, 2015, pp. 156-161.

Torfi, et al., "Differentially Private Synthetic Medical Data Generation using Convolutional GANs", In Repository of arXiv:2012.11774v1, Dec. 22, 2020, pp. 1-13.

* cited by examiner

GENERATING PRIVATE SYNTHETIC TRAINING DATA FOR TRAINING MACHINE-LEARNING MODELS

BACKGROUND

In recent years, many companies and organizations have begun collecting user data. This data is sometimes used in training machine-learning (ML) models that perform various functions. With the recent increase in the use of ML models and the variety of ways in which they are used, usage of collected user data in training ML models has become very common. Collection, storage and/or use of user data, however, requires compliance with many privacy regulations and ethical guidelines. This is also true for use of collected user data in training ML models that may be vulnerable to malicious attacks.

To ensure that confidentiality is preserved, some companies use mechanisms developed for removing personal identifiable information (PII) from collected user data. However, when collected user data includes text, information other than PII may be included in the text than can be private and/or can be used to gain access to a user's identity or other private information. For example, a text entered by a user may include location identifying information. Detecting and removing such private information, however, is often challenging and time consuming. This is particularly true for labeled training data which may include large datasets and/or require human labeling.

Some currently used ML models incorporate privacy mechanisms into the training and/or operation of the ML models such that the output is privacy compliant. However, incorporating privacy within an ML model may lead to larger and more complex models. Furthermore, since the training data used to train the ML models is not privacy compliant, the ML model may still be susceptible to malicious attacks.

Hence, there is a need for improved systems and methods of training ML models in a manner that preserves user privacy.

SUMMARY

In one general aspect, the instant disclosure describes a data processing system having a processor and a memory in communication with the processor wherein the memory stores executable instructions that, when executed by the processor, cause the data processing system to perform multiple functions. The functions may include receiving a request to generate synthetic training data for a language classifier ML model, retrieving labeled training data associated with training the language classifier ML model, providing the labeled training data, one or more privacy parameters, and a domain type associated with the labeled training data to a synthetic data generation ML model, the synthetic data generation ML model being configured to generate synthetic training data in a privacy-persevering manner, receiving synthetic privacy-preserving training data as an output from the synthetic data generation ML model, and providing the synthetic privacy-preserving training data to the language classifier ML model for training the language classifier ML model in classifying text.

In yet another general aspect, the instant disclosure describes a method for synthetic privacy preserving training data for training a language classifier ML model. The method may include receiving a request to generate the synthetic privacy-preserving training data for the language classifier ML model, retrieving labeled training data associated with training the language classifier ML model, providing the labeled training data, one or more privacy parameters, and a domain type associated with the labeled training data to a synthetic data generation ML model, the synthetic data generation ML model being configured to generate synthetic training data in a privacy-persevering manner, receiving synthetic privacy-preserving training data as an output from the synthetic data generation ML model, and providing the synthetic privacy preserving training data to the language classifier ML model for training the language classifier ML model in classifying text.

In a further general aspect, the instant disclosure describes a non-transitory computer readable medium on which are stored instructions that when executed cause a programmable device to perform functions of receiving a request to generate synthetic training data for a language classifier ML model, retrieving labeled training data associated with training the language classifier ML model, providing the labeled training data, one or more privacy parameters, and a domain type associated with the labeled training data to a synthetic data generation ML model, the synthetic data generation ML model being configured to generate synthetic training data in a privacy-persevering manner, receiving synthetic privacy-preserving training data as an output from the synthetic data generation ML model, and providing the synthetic privacy-preserving training data to the language classifier ML model for training the language classifier ML model in classifying text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
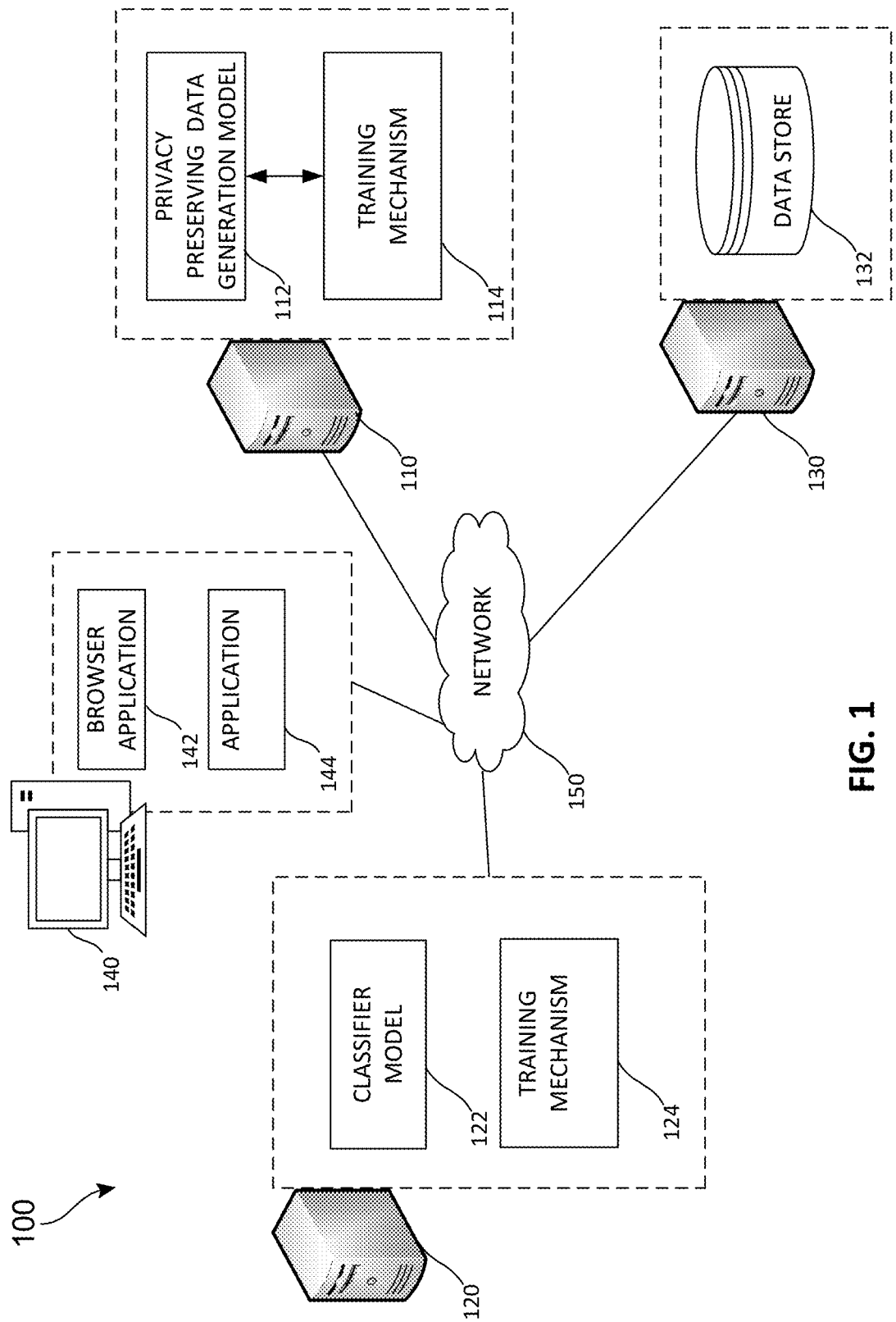
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many of today's ML models are trained using data that is collected from users. That is because user collected data often offers an inexpensive mechanism for obtaining data that is a good representative of data encountered in real world scenarios. As a result, user collected data can result in high quality training of ML models. However, user collected data often includes private data. Because trained ML models may be susceptible to cyber-attacks, private user data utilized in training such ML models may also be vulnerable to such attacks. For example, a malicious user may be able to gain access to private training data that was used to train an ML model by attacking the ML model. For example, if user feedback data used to train a user feedback classification model includes the text "on Sep. 23, 2021, while I was in the LAX airport, Microsoft Teams was very slow," a malicious attacker may be able to gain access to the user's location on a particular date and that information can then be combined with other information to identify the user. As a result, ML models that are trained using user collected data may be in danger of providing access to user's private data in malicious attacks. Thus, there exists a technical problem of susceptibility of trained ML models to releasing private training data used to train the models.

To ensure proper and secure use of user collected data, many rules and regulations regarding use of such data have been developed. Many of these rules relate to preserving the privacy of user collected data. For example, some countries enable a user to submit a request to have their personal data erased. This may apply to ML models that were trained using the user's personal data. As a result, if a user's personal data contains private or user identifiable data and such data was used to train an ML model, a user's request to erase their personal data may require removal of that user's data from the training data and retraining of the ML model. This is an expensive and time-consuming task that may occur often if users' personal or private data is used to train ML models. Thus, there exists another technical problem of inability and/or inefficiency of ML models trained with private user data to comply with privacy rules and regulations.

To preserve user privacy, some ML models have been developed that aim to incorporate mechanisms for preserving privacy within the training and/or operation of the ML models. However, incorporating privacy within an ML model may lead to larger and/or more complex models that require more memory and processing resources to store and operate. Furthermore, since the training data used to train the ML models is not privacy compliant, the ML model may still be susceptible to malicious attacks. Thus, there exists yet another technical problem of lack of efficiency in memory and/or processing resources for ML models that incorporate privacy mechanisms.

Furthermore, generating labeled training data is a time-consuming and as such expensive task. That is because labeling training data may need to be performed by a human. Moreover, most ML models require a significantly large amount of training data to be able to generate accurate outputs when trained. This means that extensive human labor is required to label training datasets. Thus, there exists another technical problem of an expensive and time-consuming process of generating labeled training data for training ML models.

To address these technical problems and more, in an example, this description provides a technical solution used for generating private synthetic labeled training data for use in training a language classification model. To do so, techniques may be used to utilize a true non-private training dataset as an input to a synthetic training data generation model to generate synthetic private and labeled training data from the true non-private data. This may be achieved by utilizing a generative adversarial network (GAN) model that utilizes differential privacy may be used. The generated synthetic private training data may then be used as training data for training a language classification model, which may be trained to classify text. In some implementations, the private synthetic labeled training data is used to label user feedback data. As a result, the technical solution herein provides an improved method of generating training data for language classification models, where the training data is both private and automatically generated. The improved method preserves user data privacy, is less costly and results in improved results without requiring the use of large models or large labeled training datasets.

As will be understood by persons of skill in the art upon reading this disclosure, benefits and advantages provided by such implementations can include, but are not limited to, a technical solution to the technical problems of lack of efficient and accurate mechanisms for generating private labeled training data for use in training language models. Technical solutions and implementations provided herein optimize the process of training language classification models, thus resulting in language classification models that are privacy compliant. The benefits provided by these technology-based solutions yield more privacy complaint ML models, and improved ML models that are trained at a lower cost.

The following terminology is used in the description. The term "private," or "confidential," may be used herein to refer to any data or information that can be used to identify a user or to gain access to personal information about a user. The term "privacy compliant" may be used to refer to a mechanism or algorithm that complies with one or more rules, regulations or guidelines relating to privacy of data. The term "feedback," may refer to any spoken or written comments received from users of products and/or services relating to the products and/or services. The term "true training data" may be used to refer to an original set of data that has been prepared (e.g., collected and labeled) for training an ML model. The term "synthetic training data" may refer to machine generated training data (e.g., fake training data).

FIG. 1 depicts an example system upon which aspects of this disclosure may be implemented. The system 100 may include a server 110, a server 120 and a storage server 130. The server 110, server 120 and storage server 130 may communicate via the network 150. The network 150 may be a wired or wireless network or a combination of wired and wireless networks that connect one or more elements of the system 100.

The server 110 may include a privacy preserving data generation model 112 and a training mechanism 114. While shown as one server, the server 110 may represent a plurality of servers that work together to deliver the functions and services provided by each logical element included in the server 110. The server 110 may operate as a shared resource server located at an enterprise accessible by one or more computer client devices such as a client device 140. The server 110 may also operate as a server for offering training data generation services via an application or online service.

The privacy preserving data generation model 112 may be an ML model trained for generating private synthetic training data from non-private true training data. The privacy preserving data generation model 112 may be trained by the training mechanism 114. The training mechanism 114 may use true training data sets stored in a data store 132 of the storage server 130 to provide initial and/or ongoing training for each of the models. Alternatively, or additionally, the training mechanism 114 may use training data sets from elsewhere. In some implementations, the training mechanism 114 uses labeled training data to train one or more of the models via deep neural network(s) or other types of ML models. The initial training may be performed in an offline stage. Additional details of the privacy preserving data generation model 112 and the training mechanism 114 are discussed in greater detail with respect to FIGS. 2 and 3.

As a general matter, the methods and systems described herein may include, or otherwise make use of an ML model to perform natural language processing (NPL), classify text and privatize data. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words, identify keywords and/or classify content. Such training may be made following the accumulation, review, and/or analysis of data (e.g., user data) over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

The system 100 may also include the server 120 which may include a classifier model 122 and a training mechanism 124. While shown as one server, the server 120 may represent a plurality of servers that work together to deliver the functions and services provided by each logical element included in the server 120. The server 120 may operate as a shared resource server located at an enterprise accessible by one or more computer client devices such as a client device 140 to provide classification services. The server 120 may also operate as a cloud-based server for offering classification services via an application or online service.

The classifier model 122 may be any ML model configured to classify text or other types of data. The classifier model 122 may be trained by the training mechanism 124. The training mechanism 124 may use synthetic training data generated by the privacy-preserving data generation model 112 and stored in the data store 132 to provide initial and/or ongoing training for the classifier model 122. Alternatively, or additionally, the training mechanism 124 may use synthetic training data sets stored elsewhere. Additional details of the classifier model 122 are discussed in greater detail with respect to FIG. 3.

In addition to the servers 110 and 120, the system 100 may include the storage server 130 which may be connected to or include the data store 132. The data store 132 which may function as a repository in which true training data, private training data, classifier model output data, data relating to user feedback, and the like may be stored. Although shown as a single data store, the data store 132 may be representative of multiple storage devices and data stores which may be accessible by one or more of the privacy-preserving data generation model 112, training mechanism 114, language model 122 and training mechanism 124.

The client device 140 may be connected to the server 110 and/or server 120 via the network 150. The client device 140 may be a personal or handheld computing device having or being connected to input/output elements that enable a user to interact with various applications such as an application 144. Examples of suitable client devices 140 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail with respect to FIGS. 5 and 6.

The client device 140 may include the application 144. The application 144 may be a native application such as computer program executed on the client device 140 that configures the device to be responsive to user input to allow a user to initiate training of the privacy preserving data generation model 112, submit a request for generating private training data to the privacy preserving data generation model 112 once it is trained and/or make use of the classification services offered by the classifier model 122. In some examples, the application used to enable the user to initiate training of the privacy preserving data generation model 112 or submit a request for generating private training data to the privacy preserving data generation model 112 once it is trained, is stored on the sever 110 and provided via an online service. In some implementations, web applications communicate via the network 150 with a browser application 142, such as an Internet browser, executing on the client device 140. The browser application 142 may provide a user interface (UI) that allows the user to interact with online applications providing services such as generating private training data or services that utilize the classifier model 122.

Figure 2:
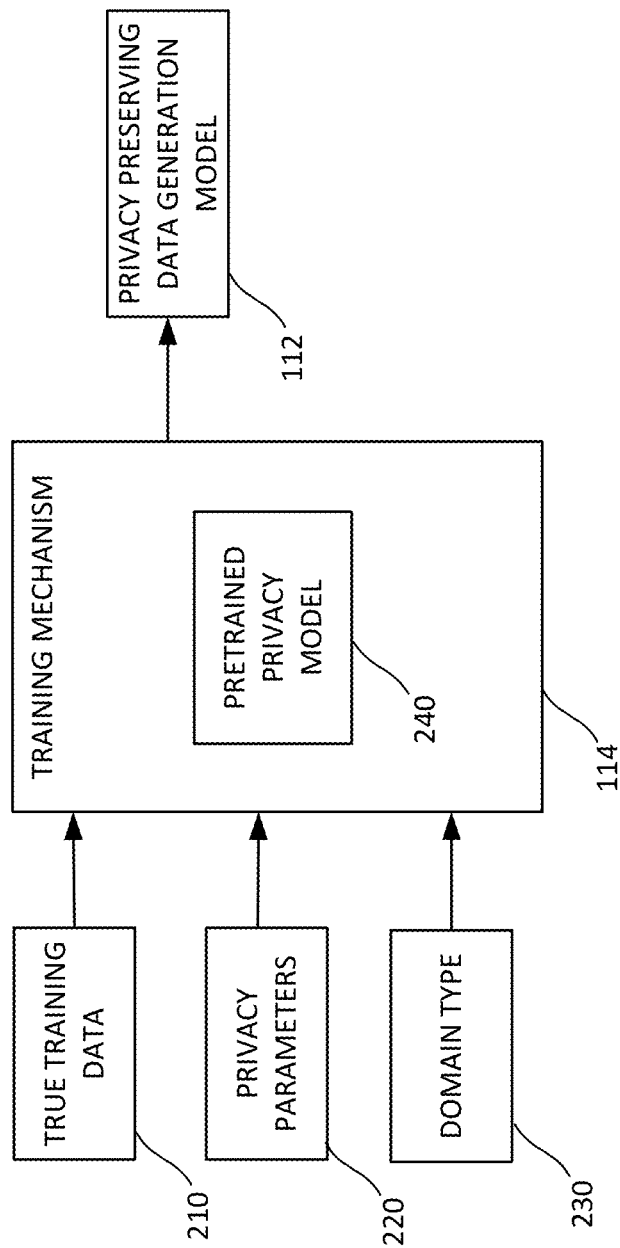
FIG. 2 depicts elements involved in training a privacy preserving data generation model.

FIG. 2 is a diagram depicting elements involved in training a privacy preserving data generation model. In some implementations, the training mechanism 114 used for training the privacy preserving data generation model makes use of a pretrained language model 240. The pretrained language model 240 may be a language model that generates text. For example, the pretrained language model 240 may be a generative model. In an example, the pretrained language model 240 is a GPT-2 model. However, many other types of generative language models may be used. In other implementations, the training mechanism 114 may train the privacy preserving data generation model without the use of a pretrained model.

The pretrained language model 240 may be a model that can incorporate privacy parameters. For example, the pretrained language model 240 may be a model that can receive differential privacy parameters such as privacy parameters 220 as some of its input and generate an output that is likely to ensure privacy of the output data. As is known in the art, differential privacy provides a mathematical assurance of privacy protection by introducing a level of noise in the input data, such that private input data will not be traceable to its origins. For example, values of some of the input data may be randomized or random data may be entered into the input data. As a result, a malicious attacker tracing the data back to its origins may encounter randomized data in place of user's actual private data.

The level of privacy provided by such pretrained privacy models may depend on the value of the privacy parameters provided. In an example, higher values for the privacy parameters lead to more private output data. However, privacy may be reversely proportional to accuracy. That is because the more private the input data is the less likely it is to be close to its original values. As a result, the privacy model is trained with a certain level of randomized data which may lead to less accurate results. Because of this, the values for the privacy parameters used to train the pretrained language model 240 may depend on the type of input training data used and the level of privacy desired for the output synthetic data. The more sensitive the input training data is the more private the output may need to be. As a result, in some implementations, the administrator (e.g., user) initiating the training of the privacy preserving data generation model 112 may be able to adjust the values of the privacy parameters 220, as needed. For example, when initiating the training, the administrator may be able to utilize a UI element to enter values for the privacy parameters. In an example, the privacy parameters are $\epsilon_m$ and $\delta$, where $\epsilon_m$ represents a parameter ensuring a multiplicative bound on change in output probability when the input datasets differ by data of one user and $\delta$ represents a differential privacy parameter such that the overall synthetic data generation model is $(\epsilon_m, \delta)$-DP private. $(\epsilon_m, \delta)$-DP which may represent differential privacy based on privacy parameters $\epsilon_m$ and $\delta$, suggests that the probability of outputting a model W, where W represents the privacy preserving data generation model, trained on two datasets D and D^' that differ in a single example is close. This is illustrated by the following mathematical formula.

$$\forall W, Prf_0[W \text{ output on } D] \leq e^{\char`\^}(\epsilon_m) \cdot Prf_0[W \text{ output on } D^{\char`\'}] + \delta \qquad (1)$$

In addition to the $\epsilon\_m$ and $\delta$ privacy parameters, a leakage threshold value may also be included in the privacy parameters 220. The leakage threshold may be a value that represents an acceptable amount of leakage of privacy information into the output data. The value of the leakage threshold may change depending on the needs of the model and the level of secrecy of the input data. In an example, the administrator is able to provide the leakage threshold value as part of the process of initiating training of the pretrained language model 240. In some implementations, a budget split ration $\alpha$ is also taken into account such that $\epsilon_m = \alpha \cdot \epsilon$ and $\epsilon_s = (1-\alpha) \cdot \epsilon$.

To train the pretrained language model 240, the training mechanism 114 may receive true training data 210, as well as the privacy parameters 220 and a domain type parameter 230. True training data 210 may include one or more training datasets that include user collected data for training a classifier model. As such, the true training data 210 may include one or more sets of labeled training data that has been generated, prepared and/or reviewed for training an ML model. As discussed above, because the labeled training data may include private information, it may not be prudent to use the training data directly. As a result, the privacy preserving data generation model 112 can be trained using the true training data to generate synthetic training data that has some of the attributes of the true training data but protects privacy. Furthermore, because collecting, labeling and/or reviewing labeled training data is a very time consuming and expensive process, the privacy preserving data generation model 112 can be trained to use a small dataset of true training data to generate a significantly larger synthetic training dataset. As a result, the technical solution disclosed herein can increase efficiency, reduce costs and protect privacy of user data.

The domain parameter provided as a domain type 230 input to the training mechanism 114 may specify the subject matter domain associated with the true training data. This may be needed to increase accuracy of the trained privacy preserving data generation model 112. For example, providing the domain type 230 may increase the ability of the trained privacy preserving data generation model 112 to generate data that is close to the true training data and as such likely to be usable by the classifier model for which the training data is being generated. The domain type 230 may be associated with the type of data analyzed by the classification model, the type of classification needed by the classifier, or it may specify the type of training data inputted to the training mechanism 114. As such, the domain type may provide contextual information for the true training data. For example, when the classifier model is intended to classify political texts in newspaper articles, the domain type provided as an input may be newspaper articles. In another example, when the type of data analyzed by the classifier model is user feedback, the domain type may be indicated as being user feedback. Other examples of domain types include email messages, tweets, text messages, social media posts, and the like.

By providing the domain type during the training of the privacy preserving data generation model 112, the training mechanisms 114 may ensure that the trained privacy preserving data generation model 112 generates synthetic training data that is likely to be similar to the input training data. For example, when the domain type is newspaper articles, providing the domain type ensures that the training mechanisms 114 trains the privacy preserving data generation model 112 in generating newspaper article like synthetic data. In some implementations, several domain types may be provided as inputs to the training mechanism to train the privacy preserving data generation model 112 for generating synthetic data relating to several different domains. For example, two different true training data sets may be transmitted as inputs to the training mechanisms, where the first true training dataset has newspaper articles as the domain type and the second true training dataset has feedback data as the domain type. When the privacy preserving data generation model 112 is trained using both domain type training datasets, the trained privacy preserving data generation model may be able to generate data for both of those domain types.

In some implementations, to train the pretrained language model 240, the training mechanism 114 utilizes the Opacus framework, which is a library for training models with differential privacy and uses the Differentially Private Stochastic Gradient Descent (DPSGD) algorithm. The use of the Opacus framework is advantageous, because the Opacus framework is easily scalable, provides high speed, and offers security by utilizing a cryptographically safe pseudo-random number generator for its security-critical code. Thus, the training mechanism 114 may use the Opacus framework to generate the trained privacy preserving data generation model 112 as a PyTorch model. In other implementations, the training mechanism 114 makes use of other frameworks to generate the privacy preserving data generation model 112. Once the training is complete, the training mechanism 114 may provide the privacy preserving data generation model 112 as an output.

Figure 3:
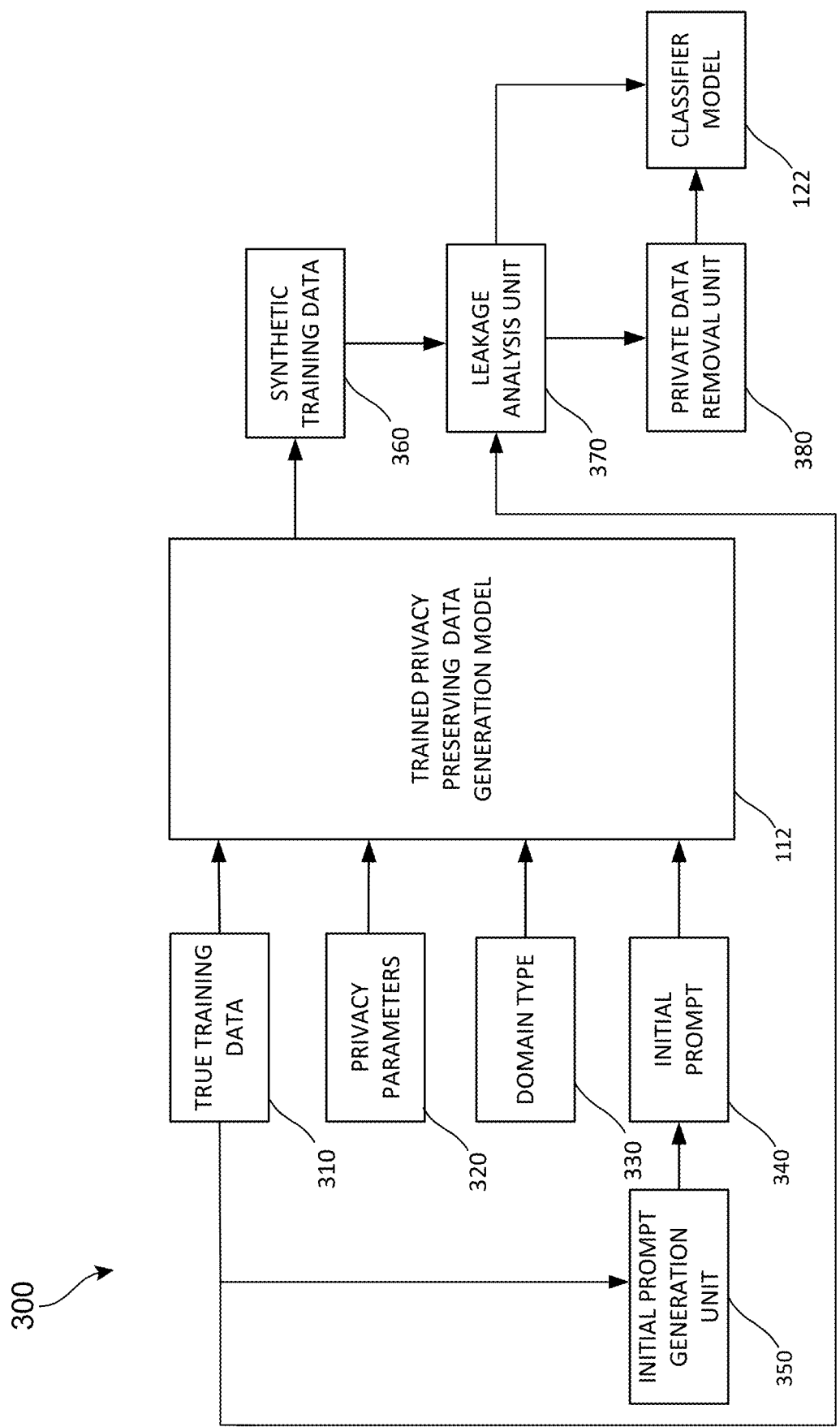
FIG. 3 depicts a system level data flow between some elements of a privacy preserving data generation system.

FIG. 3 depicts a system level data flow between some elements of a privacy preserving data generation system 300. Once the trained privacy preserving data generation model 112 has been trained and is set up to begin generating synthetic data, a set of input parameters may be transmitted to the trained privacy preserving data generation model 112 for generating synthetic data. The input parameters may include a set of true training data 310, privacy parameters 320, domain type 330 and initial prompt 340. The true training data 310 may include labeled training data generated for training a specific classifier model. The true training data 310 may be the same or different from the true training data 210 which was used to train the privacy preserving data generation model 112.

The privacy parameters 320 may include values for E, δ, leakage threshold, and/or any other privacy parameter required by the privacy preserving data generation model 112. The types of primacy parameters required may vary depending on the type of privacy model used to generate the trained privacy preserving data generation model 112 and may correspond with the primacy parameters 220 that are used to train the privacy preserving data generation model 112. The values may be set by an administrator that is initiating the synthetic data generation process. For example, the values may be entered by an administrator using a UI element to submit a request to the trained privacy preserving data generation model 112 to generate synthetic data. As discussed above, the values for the privacy parameters may vary depending on the level of privacy and/or accuracy needed, as the level of privacy is inversely proportional to the level of accuracy. In some implementations, the values for the privacy parameters are set. For example, different values for privacy parameters may be set for different domain types. For example, user feedback may be more likely to include private information and as such may require more privacy than newspaper articles. As a result, higher values may be set for training data associated with user feedback than the value set for training data associated with newspaper articles.

The domain type may be provided as input by a user or may be derived from the true training data 310. For example, the true training data 310 may itself include a parameter for the domain type of each dataset included in the true training data 310. As discussed above, the domain type may specify the types of data associated with the true training data 310. Examples of domain types include user feedback data, tweets, email messages, newspaper articles, text messages, medical records, and the like.

In some implementations, the privacy preserving data generation model 112 also receives an initial prompt 340 as an input. The initial prompt 340 may be provided to increase the accuracy of the generated synthetic data. To provide the initial prompt 340, an initial prompt generation unit 350 may be utilized that receives the true training data 310 as an input and generates an initial prompt based on the true training data 310 as an output. This may involve sampling the first few words of each data entry in the true training data 310 in a privacy preserving manner. To achieve this, the initial prompt generation unit 350 may retrieve the first few words of each data entry in the true training data 310 but remove words that are likely to indicate privacy. In other words, any words that indicate they may be specific to a particular user or may identify a particular user may be removed from the sampled data.

The initial prompt generation unit 350 may be configured to create the initial prompt by utilizing one or more histograms. For example, to generate prompts of K number of tokens (e.g., number of sample words) using true data with a trained privacy preserving data generation model that is ($\epsilon\_s$)-Differentially private, a $\epsilon\_s$-Differentially private histogram of starting tokens of length K of true data may be created. This means a histogram may be created based on K number of starting words of each data entry, where the histogram ensures that the words that are selected are $\epsilon\_s$-Differentially private. To achieve this, an initial histogram that is not differentially private may first be created, before noise is added to the histogram to make it privacy preserving. In an example, the noisy histogram is created by adding Laplacian ($1/\epsilon\_s$) noise to the histogram. The K-length prompts may then be sampled from the histogram to generate the initial prompt. In this manner, data is sampled from the true training data 310 in a privacy persevering manner. Providing the initial prompt 340 generated in this manner as an input to the privacy preserving data generation model 112 can increase the accuracy of the downstream language classification model and the quality of the synthetic training data generated. When the initial prompt is provided to the privacy preserving data generation model 112, the privacy preserving data generation model 112 may generate synthetic text that is related to the relevant domain type, is appropriate for the input label and begins with the input initial prompt. In alternative implementations, the initial prompt is not provided as an input to the privacy preserving data generation model 112. When the initial prompt 340 is not provided, the privacy preserving data generation model 112 may simply generate synthetic text that is related to the relevant domain type and is appropriate for the input label.

To initiate generation of the synthetic training data, a prompt containing the input parameters may be transmitted to the privacy preserving data generation model 112. For example, the privacy preserving data generation model 112 may receive a prompt with the input true training data in the form of label and domain (input (label, domain)), with privacy parameter values and the initial prompt. In implementations where the initial prompt is not provided as an input, the prompt may include the input true training data in the form of label and domain (input (label, domain)) and the privacy parameter values.

Once all of the input parameters are provided to the privacy preserving data generation model 112, the privacy preserving data generation model 112 processes and analyzes the inputs to generate the synthetic training data 360 as an output. The synthetic training data 360 may include labeled training data that includes a domain type as a parameter associated with the training data. The synthetic training data 360 may include one or more sets of training data that are privacy compliant, resemble the true training data 310 such that it can be used for training a classifier model and can include more data than the original true training data 310. As such, not only does the synthetic training data ensures privacy, it can also increase efficiency and reduce costs associated with training a classifier model.

To ensure that the trained privacy preserving data generation model 112 provides the level of privacy required, a leakage analysis unit 370 may be utilized to check the level of private data included in the synthetic training data 360. This may involve analyzing the synthetic training data to determine the amount or percentage of private data still present in the synthetic training data. To achieve this, the leakage analysis unit 370 may receive the true training data 310, the synthetic training data 360 and the leakage threshold discussed above, as input. The leakage analysis unit 370 may then determine, based on the provided input, if the synthetic training data 360 includes any information that is private to a user. This may be achieved by utilizing n-grams. In an example, L(D,K,U) represents a function that given a dataset D, length K and number of users U, returns n-grams of length at-most K that are present for no more than U users in the dataset D. Furthermore, L(D,K,∞) represents the set of all n-grams of length at-most K present in the dataset D. Then, for true dataset X and a target dataset Y, the leakage function μ may be defined as:

$$\mu(X,Y,K,U) = |L(X,K,U) \cap L(Y,K,\infty)| / |(X,K,U)| \times 100 \qquad (2)$$

It should be noted that |L(.,.,.)| in formula 2 denotes the cardinality of the set. When the leakage function μ is calculated with Y being the synthetic dataset generated, and given specific numbers for K and U, the leakage function provides a percentage of n-grams unique to a user in the true data that is leaked in the synthetic data. When the calculated value for μ is larger than zero, this indicates that the synthetic training data includes some private user data. Depending on the calculated value of μ and the needs and privacy constraints of the true training data, this may indicate that the synthetic data needs to be further processed to remove the private data. This may be achieved by utilizing a private data removal unit 380. The private data removal unit 380 may examine the synthetic data 360 and remove any data points that contributed to the leakage. This may be achieved by utilizing text identifiers (e.g., document IDs) associated with documents that contributed to the leakage.

Once some or all of the remaining private data is removed from the synthetic training data 360 or it is determined that removal is not required, the synthetic training data 360 may be provided to the classifier model 122 for training. The classifier model 122 may then be trained by a training mechanism such as the training mechanism 124 of FIG. 1 to classify data by utilizing the synthetic training data 360. In some implementations, the classifier model 122 is trained to classify text based on the labels provided in the synthetic training data 360. For example, a user feedback classifier model may be trained to classify user feedback text into different categories. In this manner, classification models can be generated by utilizing privacy preserving training data. Such classification models are safe to deploy and are not susceptible to attacks that reveal private information about users.

Figure 4:
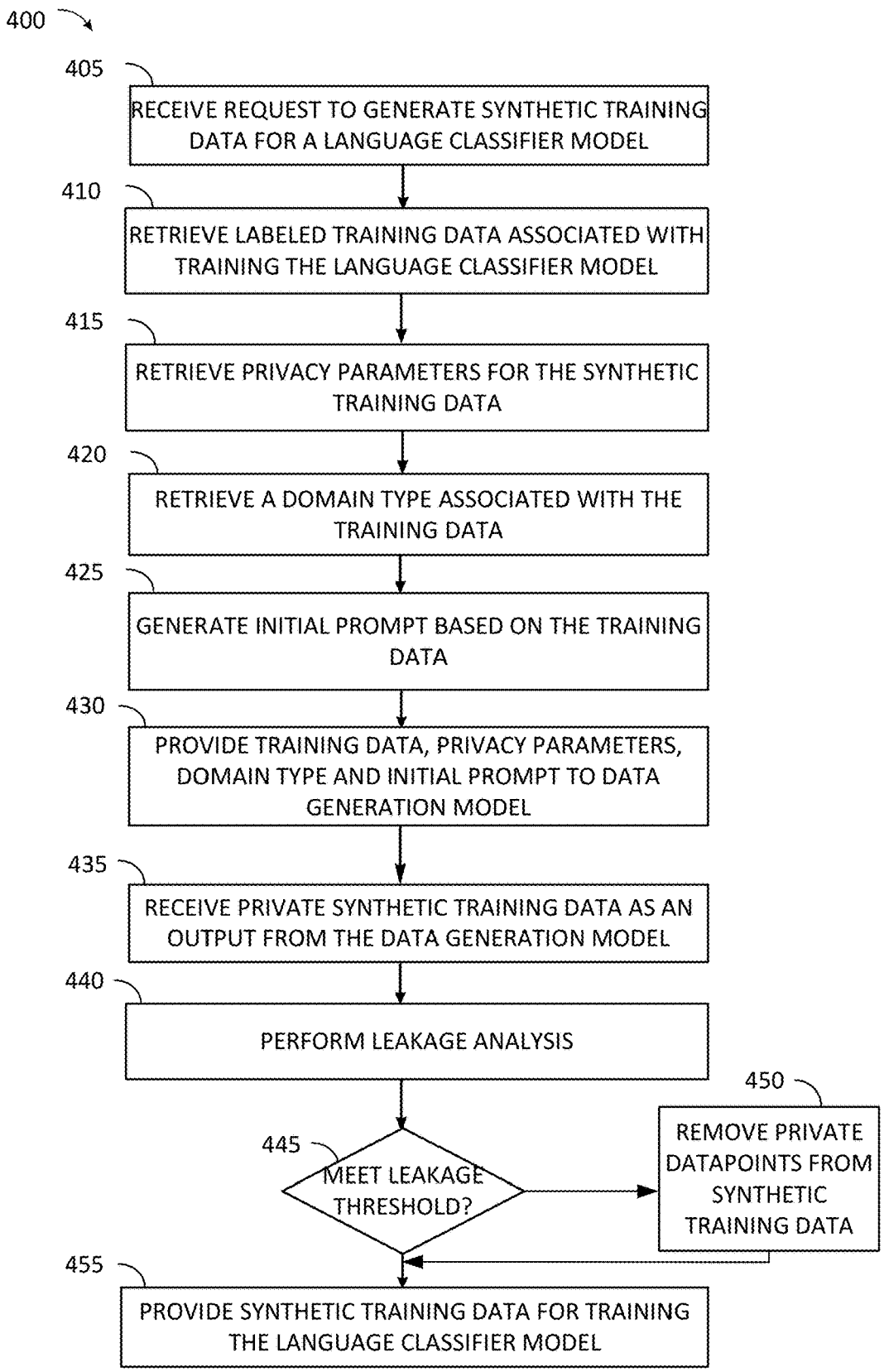
FIG. 4 is a flow diagram depicting an example method for generating private synthetic training data for training a classification model.

FIG. 4 is a flow diagram depicting an exemplary method 400 for generating private synthetic training data for training a classification model. One of more steps of the method 400 may be performed by a training data generation unit such as the privacy preserving data generation model 112 of FIGS. 1-3, a leakage analysis unit such as the leakage analysis unit 370 of FIG. 3 and a private data removal unit, such as the private data removal unit 380 of FIG. 3.

At 405, method 400 may begin by receiving a request to generate synthetic training data for a given language classifier model. The request may be received from a user utilizing the system to generate private training data for a particular type of language classifier model. For example, if the user determines that the training data for a language classifier model includes private data, the user may submit a request for generating private synthetic training data for the language classifier model. Alternatively, the request may be generated or submitted automatically as part of a process of analyzing training data for training a language model or the synthetic training data generation process may be invoked automatically when one or more types of training data are used to train an ML model.

Once the request for generating synthetic training data is received, method 400 may proceed to retrieve labeled training data associated with training the desired language classifier model, at 410. The labeled training data may include user data which contains private information or any information that can be used to identify a user. The labeled training data may be retrieved from a data store that stores training data for training the language classifier model.

In addition to retrieving the labeled training data, method 400 may also retrieve privacy parameters for generating the private synthetic training data, at 415. The privacy parameters may be provided by a user (e.g., administrator) or they may be predetermined (e.g., based on the domain type or type of classifier model). In addition to the privacy parameters, a domain type associated with the training data may also be retrieved, at 420. The domain type may be provided by a user or it may be included as part of the labeled training data. The domain type may specific the subject matter or type of data the training data is associated with.

In some implementations, method 400 generates privacy preserving training data based on the sample prompt, at 425. The privacy preserving training data may sample the first few words of one or more entries in the training data in a privacy preserving manner, such that the first few (e.g., 3 private words) of entries in the training data are generated and provided as an input to the privacy preserving data generation model. Once all the required inputs have been retrieved and/or generated, method 400 may proceed to provide the training data, privacy parameters, domain type and initial prompt to the privacy preserving data generation model, at 430. In some implementations, the prompt is not provided as an input to the privacy preserving data generation model.

Once all of the required inputs are provided to the privacy preserving data generation model, method 400 may proceed to receive a private synthetic training dataset as an output of the privacy preserving data generation model, at 435. The private synthetic training data may include a training dataset that preserves privacy and is geared towards training the particular classifier model associated with the true training data. To ensure that the synthetic training data generated by private synthetic training dataset preserves privacy at a required level, method 400 may proceed to perform a leakage analysis on the generated synthetic training data, at 440.

The leakage analysis may involve analyzing the synthetic training data to ensure that the percentage of private data included in the synthetic training data does not exceed a given leakage threshold. Thus, method 400 may proceed to determine, at 445, if the synthetic training data meets the leakage threshold. When it is determined that the synthetic training data meets the leakage threshold, method 400 may proceed to provide the synthetic training data for training the language classifier model, at 455.

When it is determined, however, that the synthetic training data fails to meet the leakage threshold (e.g., the percentage of private data included in the synthetic training data exceeds the leakage threshold), method 400 may proceed to removal some or all of the private datapoints detected in the synthetic training data, at 450. Once the required private data has been removed from the synthetic training data, method 400 may proceed to provide the synthetic training data for training the language classifier model, at 455.

Figure 5:
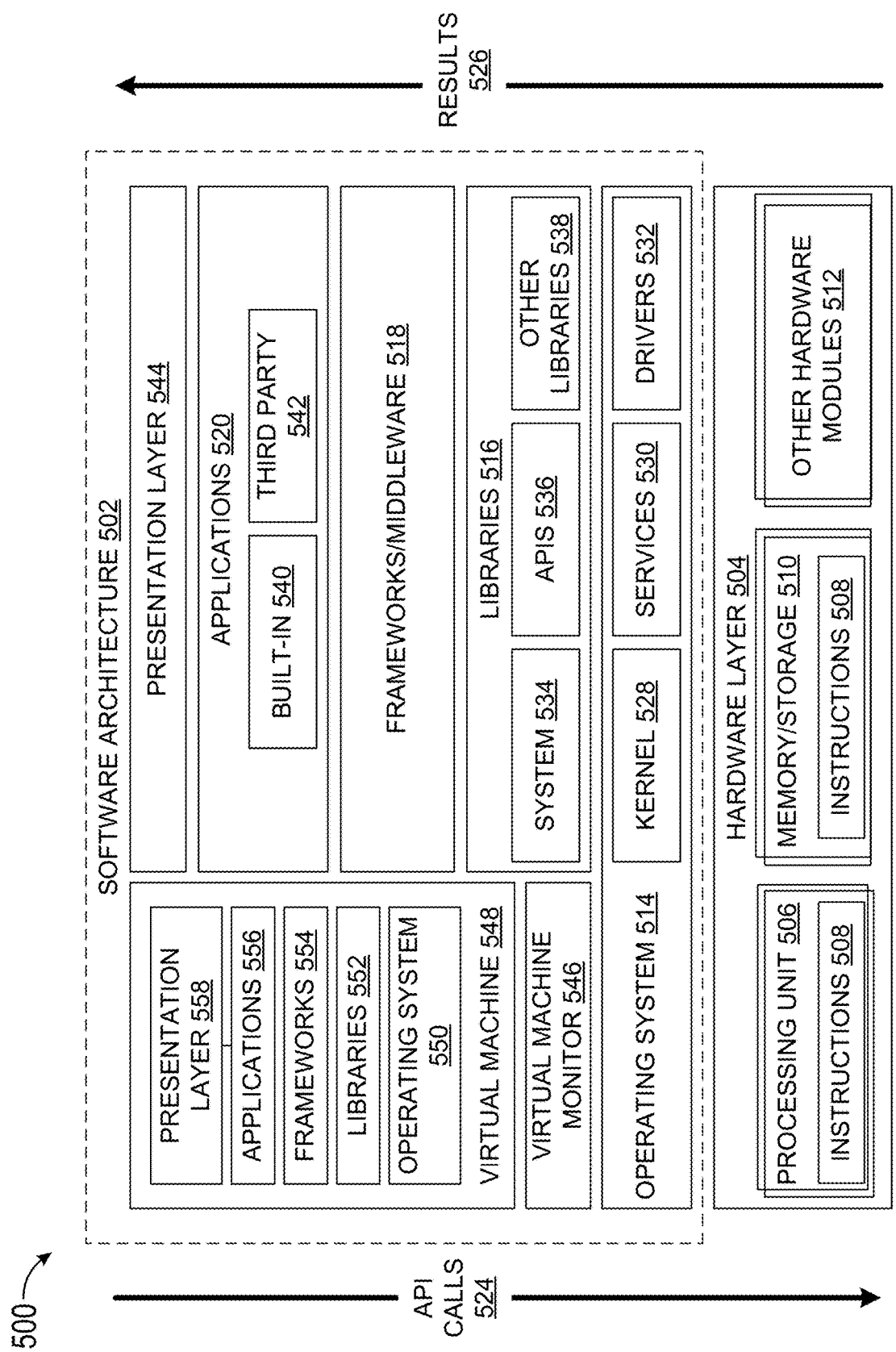
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
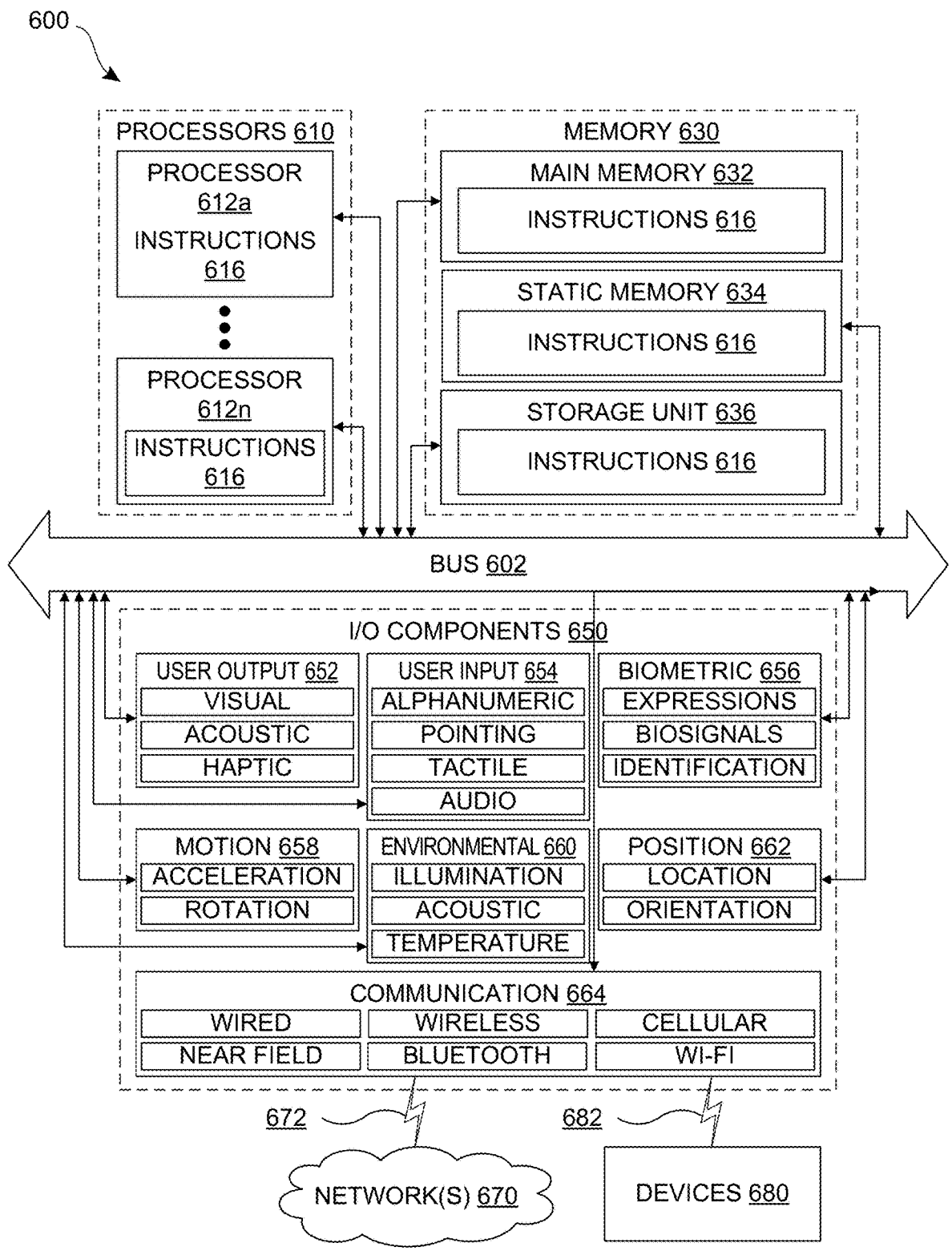
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by, the processor, cause the data processing system to perform functions of:
    receiving a request to generate synthetic training data for a language classifier machine-learning (ML) model;
    retrieving labeled training data associated with training the language classifier ML model;
    providing the labeled training data, one or more privacy parameters, and a domain type associated with the labeled training data to a synthetic data generation ML model, the synthetic data generation ML model being configured to generate synthetic training data in a privacy-persevering manner;
    receiving synthetic privacy-preserving training data as an output from the synthetic data generation ML model; and
    providing the synthetic privacy-preserving training data to the language classifier ML model for training the language classifier ML model in classifying text.

Item 2. The data processing system of item 1, wherein the instructions further cause the processor to cause the data processing system to perform functions of:
    analyzing the synthetic privacy preserving training data to determine that the synthetic privacy-preserving training data does not meet a leakage threshold for including private data; and
    responsive to determining that the synthetic privacy-preserving training data does not meet the leakage threshold, removing one or more identified private data points from the synthetic privacy-preserving training data.

Item 3. The data processing system of item 2, wherein the leakage threshold is a parameter associated with an acceptable amount of private data in the synthetic privacy-preserving training data.

Item 4. The data processing system of any preceding item, wherein the instructions further cause the processor to cause the data processing system to perform functions of:
generating an initial prompt from one or more datasets of the labeled training data, and
providing the initial prompt as an input to the synthetic data generation ML model for generating the synthetic privacy-preserving training data.

Item 5. The data processing system of item 4, wherein generating the initial prompt includes sampling one or more privacy-preserving words from one or more datapoints in the labeled training data.

Item 6. The data processing system of any preceding item, wherein the privacy parameters include one or more differential privacy parameters.

Item 7. The data processing system of any preceding item, wherein the synthetic data generation ML model is a generative adversarial network (GAN) model.

Item 8. The data processing system of any preceding item, wherein the training data includes user feedback data and the language classifier ML model is used for classifying the user feedback data.

Item 9. A method for synthetic privacy preserving training data for training a language classifier machine-learning (ML) model, comprising:
receiving a request to generate the synthetic privacy-preserving training data for the language classifier ML model;
retrieving labeled training data associated with training the language classifier ML model;
providing the labeled training data, one or more privacy parameters, and a domain type associated with the labeled training data to a synthetic data generation ML model, the synthetic data generation ML model being configured to generate synthetic training data in a privacy-persevering manner;
receiving synthetic privacy-preserving training data as an output from the synthetic data generation ML model; and
providing the synthetic privacy preserving training data to the language classifier ML model for training the language classifier ML model in classifying text.

Item 10. The method of item 9, further comprising:
analyzing the synthetic privacy-preserving training data to determine that the synthetic privacy preserving training data does not meet a leakage threshold for including private data; and
responsive to determining that the synthetic privacy-preserving training data does not meet the leakage threshold, removing one or more identified private data points from the synthetic privacy-preserving training data.

Item 11. The method of item 10, wherein the leakage threshold is a parameter associated with an acceptable amount of private data in the synthetic privacy-preserving training data.

Item 12. The method of any of items 9-11, further comprising:
generating an initial prompt from one or more datasets of the labeled training data, and
providing the initial prompt as an input to the synthetic data generation ML model for generating the synthetic privacy-preserving training data.

Item 13. The method of item 12, wherein generating the initial prompt includes sampling one or more privacy-preserving words from one or more datapoints in the labeled training data.

Item 14. The method of any of items 9-13, wherein the privacy parameters include one or more differential privacy parameters.

Item 15. The method of any of items 9-14, wherein the synthetic data generation ML model is a generative adversarial network (GAN) model.

Item 16. The method of any of items 9-15, wherein the training data includes user feedback data and the language classifier ML model is used for classifying the user feedback data.

Item 17. A non-transitory computer readable medium on which are stored instructions that, when executed, cause a programmable device to perform functions of:
receiving a request to generate synthetic training data for a language classifier machine-learning (ML) model;
retrieving labeled training data associated with training the language classifier ML model;
providing the labeled training data, one or more privacy parameters, and a domain type associated with the labeled training data to a synthetic data generation ML model, the synthetic data generation ML model being configured to generate synthetic training data in a privacy-persevering manner;
receiving synthetic privacy preserving training data as an output from the synthetic data generation ML model; and
providing the synthetic privacy-preserving training data to the language classifier ML model for training the language classifier ML model in classifying text.

Item 18. The non-transitory computer readable medium of item 17, wherein the instructions further cause the programmable device to perform functions of:
analyzing the synthetic privacy-preserving training data to determine that the synthetic privacy preserving training data does not meet a leakage threshold for including private data; and
responsive to determining that the synthetic privacy-preserving training data does not meet the leakage threshold, removing one or more identified private data points from the synthetic privacy preserving training data.

Item 19. The non-transitory computer readable medium of items 17 or 18, wherein the instructions further cause the programmable device to perform functions of:
generating an initial prompt from one or more datasets of the labeled training data, and
providing the initial prompt as an input to the synthetic data generation ML model for generating the synthetic privacy-preserving training data.

Item 20. The non-transitory computer readable medium of any of items 17-19, wherein the training data includes user feedback data and the language classifier ML model is used for classifying the user feedback data.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by, the processor, cause the data processing system to perform functions of:
   receiving a request to generate synthetic training data for a language classifier machine-learning (ML) model;
   retrieving labeled training data associated with training the language classifier ML model;
   providing the labeled training data, one or more privacy parameters, and a domain type associated with the labeled training data to a synthetic data generation ML model, the synthetic data generation ML model being configured to generate synthetic training data in a privacy-persevering manner,
   wherein the privacy parameters include one or more differential privacy parameters having values that are dependent on a level of privacy required and the domain type;
   receiving synthetic privacy-preserving training data as an output from the synthetic data generation ML model; and
   providing the synthetic privacy-preserving training data to the language classifier ML model for training the language classifier ML model in classifying text,
   wherein the synthetic privacy-preserving training data includes more training data than the retrieved labeled training data, and
   wherein the synthetic privacy-preserving training data excludes private data in accordance with the privacy parameters and a predetermined leakage threshold for including private data.

2. The data processing system of claim 1, wherein the instructions further cause the processor to cause the data processing system to perform functions of:
   analyzing the synthetic privacy-preserving training data to determine that the synthetic privacy-preserving training data does not meet the leakage threshold for including private data; and
   responsive to determining that the synthetic privacy-preserving training data does not meet the leakage threshold, removing one or more identified private data points from the synthetic privacy-preserving training data.

3. The data processing system of claim 2, wherein the leakage threshold is a parameter associated with an acceptable amount of private data in the synthetic privacy-preserving training data.

4. The data processing system of claim 1, wherein the instructions further cause the processor to cause the data processing system to perform functions of:
   generating an initial prompt from one or more datasets of the labeled training data, and
   providing the initial prompt as an input to the synthetic data generation ML model for generating the synthetic privacy-preserving training data.

5. The data processing system of claim 4, wherein generating the initial prompt includes sampling one or more privacy-preserving words from one or more datapoints in the labeled training data.

6. The data processing system of claim 1, wherein the synthetic data generation ML model is a generative adversarial network (GAN) model.

7. The data processing system of claim 1, wherein the training data includes user feedback data and the language classifier ML model is used for classifying the user feedback data.

8. A method for synthetic privacy-preserving training data for training a language classifier machine-learning (ML) model, comprising:
   receiving a request to generate the synthetic privacy-preserving training data for the language classifier ML model;

retrieving labeled training data associated with training the language classifier ML model;

providing the labeled training data, one or more privacy parameters, and a domain type associated with the labeled training data to a synthetic data generation ML model, the synthetic data generation ML model being configured to generate synthetic training data in a privacy-persevering manner, wherein the privacy parameters include one or more differential privacy parameters having values that are dependent on a level of privacy required and the domain type;

receiving synthetic privacy-preserving training data as an output from the synthetic data generation ML model; and providing the synthetic privacy-preserving training data to the language classifier ML model for training the language classifier ML model in classifying text, wherein the synthetic privacy-preserving training data includes more training data than the retrieved labeled training data, and wherein the synthetic privacy-preserving training data excludes private data in accordance with the privacy parameters and a predetermined leakage threshold for including private data.

9. The method of claim 8, further comprising: analyzing the synthetic privacy-preserving training data to determine that the synthetic privacy-preserving training data does not meet the leakage threshold for including private data; and responsive to determining that the synthetic privacy-preserving training data does not meet the leakage threshold, removing one or more identified private data points from the synthetic privacy-preserving training data.

10. The method of claim 9, wherein the leakage threshold is a parameter associated with an acceptable amount of private data in the synthetic privacy-preserving training data.

11. The method of claim 8, further comprising:
generating an initial prompt from one or more datasets of the labeled training data, and
providing the initial prompt as an input to the synthetic data generation ML model for generating the synthetic privacy-preserving training data.

12. The method of claim 11, wherein generating the initial prompt includes sampling one or more privacy-preserving words from one or more datapoints in the labeled training data.

13. The method of claim 8, wherein the synthetic data generation ML model is a generative adversarial network (GAN) model.

14. The method of claim 8, wherein the training data includes user feedback data and the language classifier ML model is used for classifying the user feedback data.

15. A non-transitory computer readable medium on which are stored instructions that, when executed, cause a programmable device to perform functions of:

receiving a request to generate synthetic training data for a language classifier machine-learning (ML) model;

retrieving labeled training data associated with training the language classifier ML model;

providing the labeled training data, one or more privacy parameters, and a domain type associated with the labeled training data to a synthetic data generation ML model, the synthetic data generation ML model being configured to generate synthetic training data in a privacy-persevering manner, wherein the privacy parameters include one or more differential privacy parameters having values that are dependent on a level of privacy required and the domain type;

receiving synthetic privacy-preserving training data as an output from the synthetic data generation ML model; and providing the synthetic privacy-preserving training data to the language classifier ML model for training the language classifier ML model in classifying text, wherein the synthetic privacy-preserving training data includes more training data than the retrieved labeled training data, and wherein the synthetic privacy-preserving training data excludes private data in accordance with the privacy parameters and a predetermined leakage threshold for including private data.

16. The non-transitory computer readable medium of claim 15, wherein the instructions further cause the programmable device to perform functions of:

analyzing the synthetic privacy-preserving training data to determine that the synthetic privacy-preserving training data does not meet the leakage threshold for including private data; and responsive to determining that the synthetic privacy-preserving training data does not meet the leakage threshold, removing one or more identified private data points from the synthetic privacy-preserving training data.

17. The non-transitory computer readable medium of claim 15, wherein the instructions further cause the programmable device to perform functions of:

generating an initial prompt from one or more datasets of the labeled training data, and
providing the initial prompt as an input to the synthetic data generation ML model for generating the synthetic privacy-preserving training data.

18. The non-transitory computer readable medium of claim 15, wherein the training data includes user feedback data and the language classifier ML model is used for classifying the user feedback data.

* * * * *